United States Patent [19]

Haggerty et al.

[11] Patent Number: 4,778,199

[45] Date of Patent: Oct. 18, 1988

[54] SUSPENSION SYSTEM

[75] Inventors: John A. Haggerty, Norton; Roy L. Orndorff, Jr., Kent, both of Ohio

[73] Assignee: The B. F. Goodrich Company, Akron, Ohio

[21] Appl. No.: 859,675

[22] Filed: May 5, 1986

[51] Int. Cl.⁴ .......................... B60G 11/18; B60G 5/04
[52] U.S. Cl. ..................................... 280/721; 280/717; 280/700; 267/273; 267/279
[58] Field of Search ............... 280/688, 715, 724, 696, 280/697, 721, 717, 695, 700; 267/280, 282, 273, 279, 285

[56] References Cited

U.S. PATENT DOCUMENTS

| | | | |
|---|---|---|---|
| 2,330,482 | 9/1943 | Fageol | 280/717 |
| 3,113,769 | 12/1963 | Pryale | 280/717 |
| 3,601,424 | 8/1971 | Badland | 280/717 |
| 3,701,542 | 10/1972 | Grosseau | 280/721 |
| 3,737,174 | 6/1973 | Hickman | 280/717 |
| 3,770,291 | 11/1973 | Kramer | 280/721 |
| 4,171,920 | 10/1979 | Kramer et al. | 267/279 |
| 4,256,327 | 3/1981 | Leinweber | 280/721 |
| 4,589,677 | 5/1986 | Matschinsky | 267/279 |
| 4,720,121 | 1/1988 | Kikuchi et al. | 280/721 |

Primary Examiner—Richard A. Bertsch
Attorney, Agent, or Firm—Joseph Januszkiewicz

[57] ABSTRACT

A suspension system for a motorized propeller vehicle wherein the weight of the vehicle is supported by torsion springs. The vehicle chassis supports the drive output shafts and are connected to the driven wheels via a splined connection. The vehicle wheels have a stationary wheel drum bracket with an upper bracket section and a lower bracket section located respectively above and below the drive shaft connection to the wheel. The torsion spring suspension includes a pair of upper torsion springs interconnecting the vehicle chassis to the upper bracket section of the wheels and a pair of lower torsion springs interconnecting the vehicle chassis to the lower bracket section of the wheels.

13 Claims, 6 Drawing Sheets

SUSPENSION SYSTEM

BACKGROUND OF THE INVENTION

The present invention relates to a suspension system for a vehicle and more particularly to a suspension for an independent drive axle.

Conventional vehicle suspension systems that are cooperative with the drive axle utilize coil springs and complex control linkages in order to protect the drive axle output. This has been standard construction so that no forces are transmitted back to the differential and its accompanying transmission. Further, when a vehicle is braked on a vehicle having independent suspensions that are coupled to the drive shaft, there is a problem of maintaining vehicle control due to the unusual forces imparted to the wheel axle. U.S. Pat. No. 3,770,291 to Kramer discloses a torsion suspension system employing three torsion springs, two of which are connected directly to a drive axle housing wherein the forces reacting on the wheel will impart their stresses and force reactions to the drive axle and the universal joint as well as the differential. Further, forces on one wheel are transmitted to the other wheel. The present invention provides an independent suspension system that utilizes a torsion spring operative with the drive shaft wherein the suspension system absorbs all forces from the wheel which would otherwise be transferred through the drive shaft to the differential. The present invention further provides a compact unit that eliminates bulky struts and extraneous tie rods for the system with no requirement for lubrication. Such suspension system is particularly advantageous in that it requires a minimum of ground clearance thereby permitting a lower center of gravity for the vehicle which is very important as in the case of motor homes. A modification of the invention employs a torsion spring system that provides a simplified independent system that is also maintenance free and also requires no lubrication.

SUMMARY OF THE INVENTION

The present invention provides a suspension system for a motor vehicle employing upper and lower torsion springs which interconnect the chassis frame to upper and lower support brackets which support the wheels for rotation. A drive shaft with a splined connection which is driven directly from the differential is connected to the wheel and is positioned between the upper torsion springs and the lower torsion springs providing independent wheel drive and travel as in a vertical plane relative to a stationary output shaft of the differential. Such suspension system allows for uniform as well as non-uniform wheel motion while limiting tilt deflection under maximum acceleration, braking and skid forces while maintaining low ground clearance. Such suspension system eliminates compressive load transfer to the drive shaft or to the differential. A modified design permits a simpler torsion spring design that provides maintenance free structure while also eliminating lubrication.

DESCRIPTION OF THE PREFERRED EMBODIMENT

Figure 1:
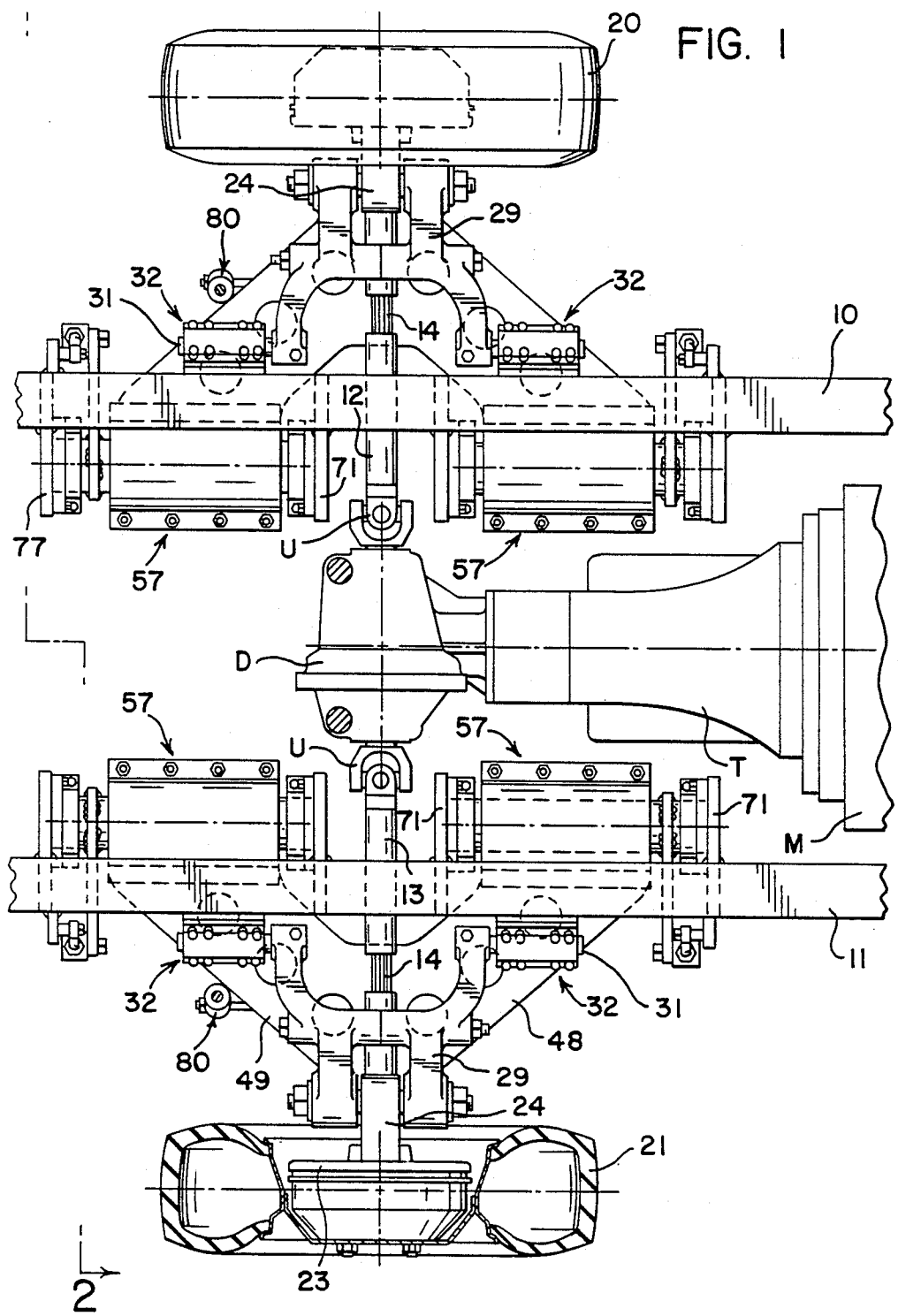
FIG. 1 is a plan view of a suspension system for the drive axle of a vehicle embodying the invention.

Referring now to the drawings wherein like reference numerals designate like or corresponding parts throughout the several views, there is shown in FIG. 1 a pair of laterally spaced support members 10 and 11 which are part of the main support frame or chassis of a vehicle such as a motor home. Suitably mounted on the support frame of the vehicle is a motor M having its output connected via a transmission means T to a differential D whose drive output in turn is connected to a pair of laterally extending axles 12 and 13 via universal joint U. Such drive axles are connected via splined shafts 14 to rotate wheels 20 and 21 in a manner old and well known in the art.

Figure 2:
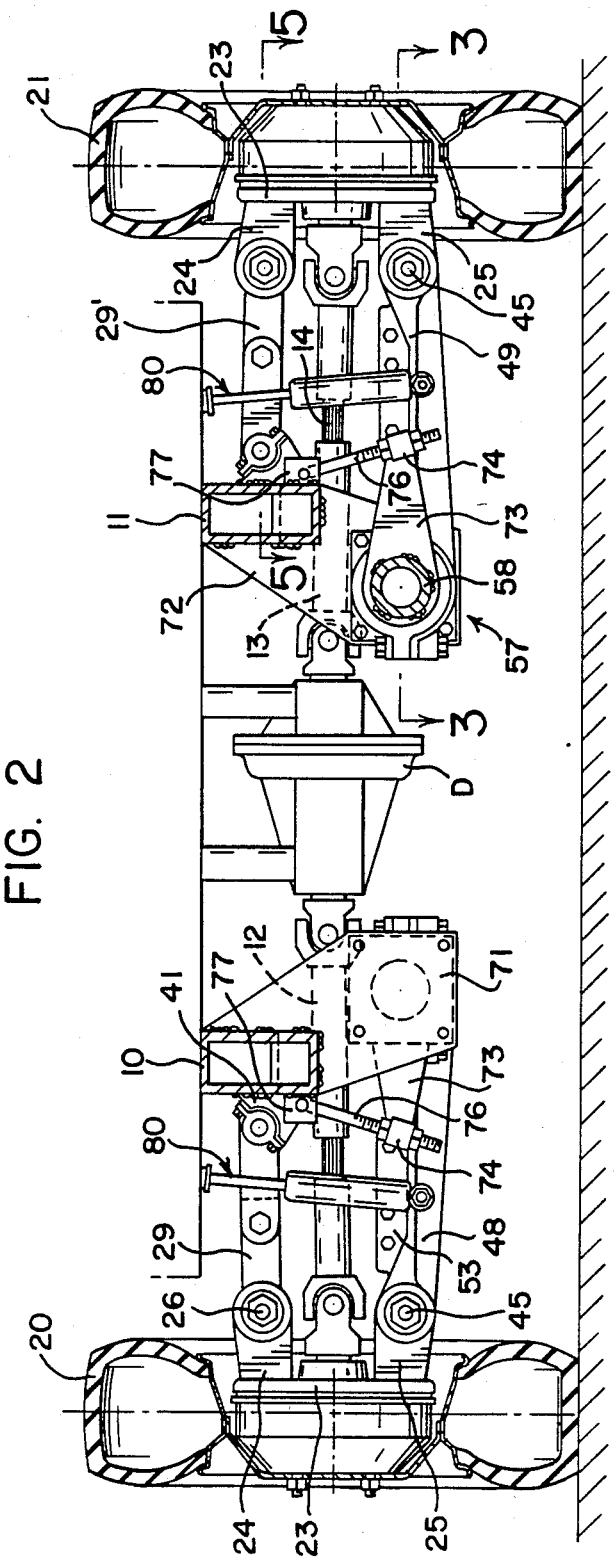
FIG. 2 is a front elevational view of the suspension system taken on line 2—2 of FIG. 1.
Figure 3:
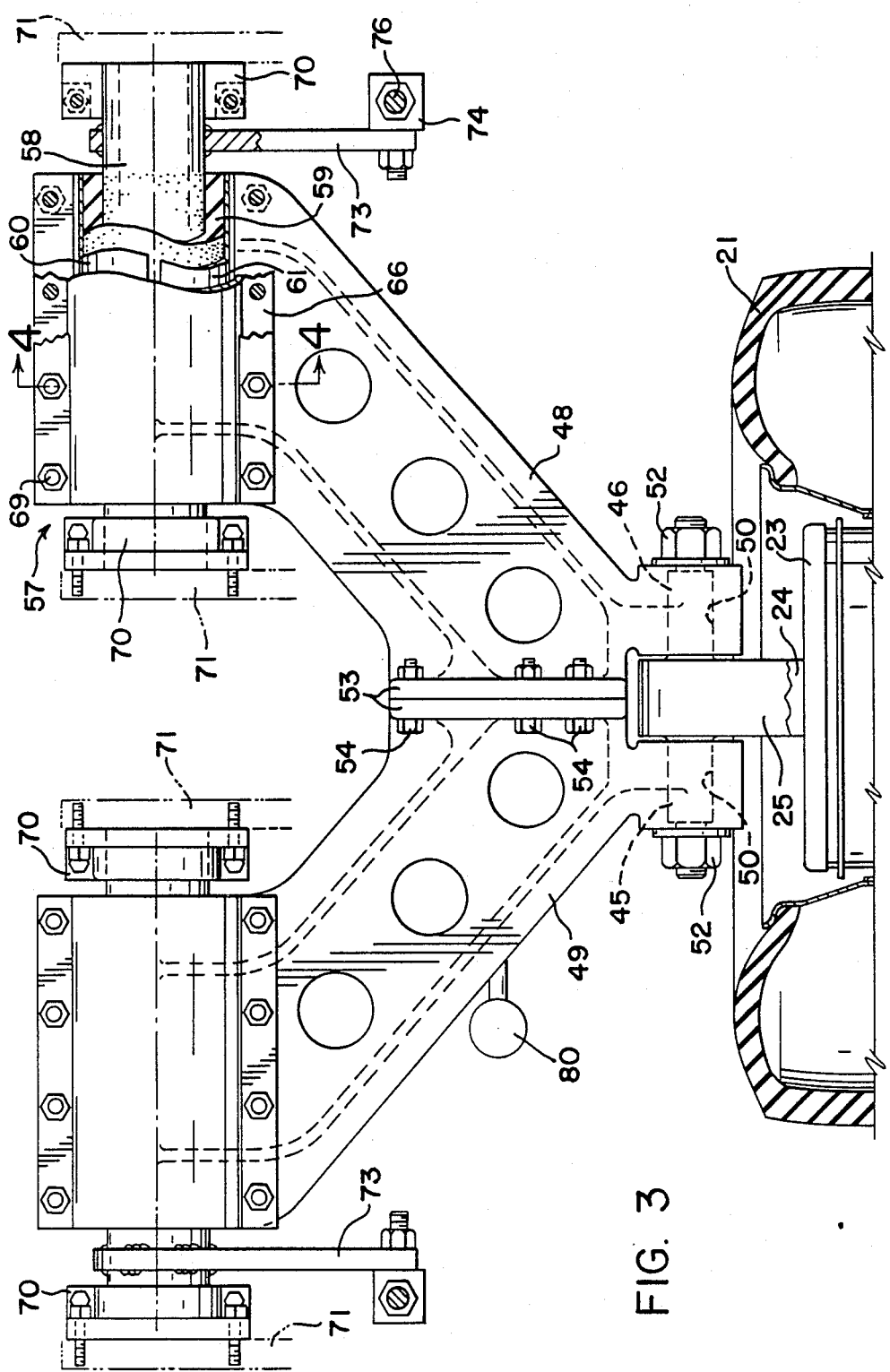
FIG. 3 is an enlarged plan view of the lower portion of the suspension system shown in FIG. 1 taken on line 3—3 in FIG. 2.
Figure 5:
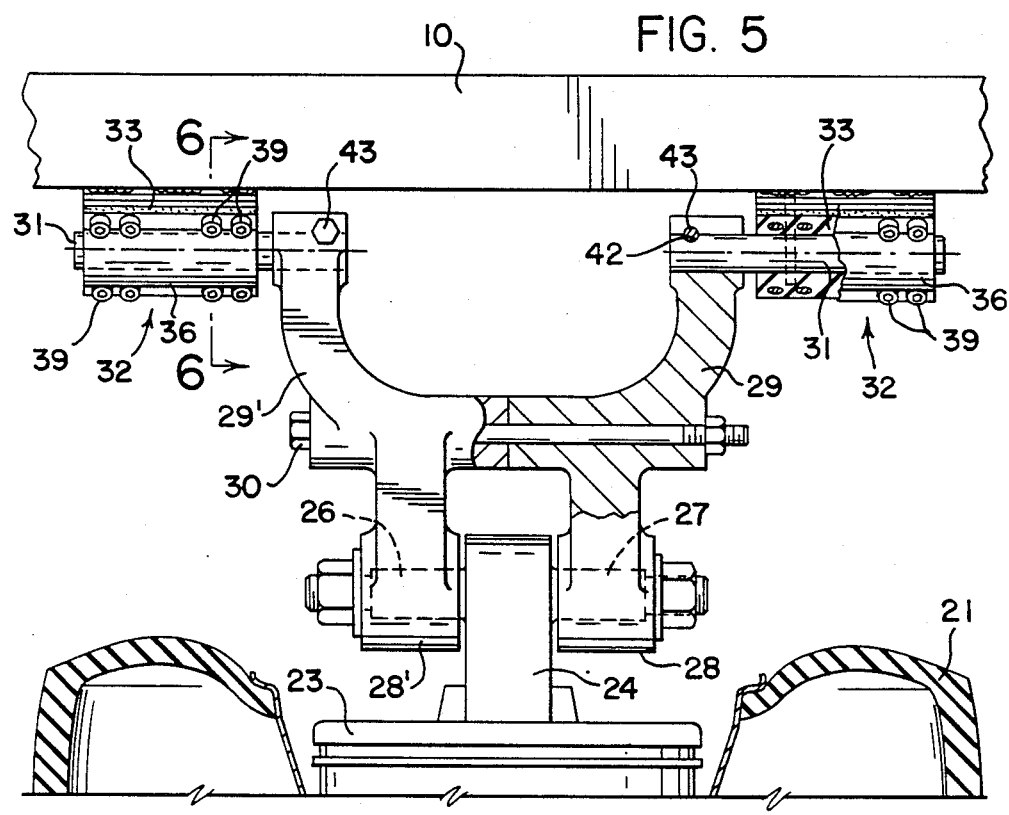
FIG. 5 is an enlarged plan view partly in section of the upper portion of the suspension system taken on line 5—5 in FIG. 2.
Figure 6:
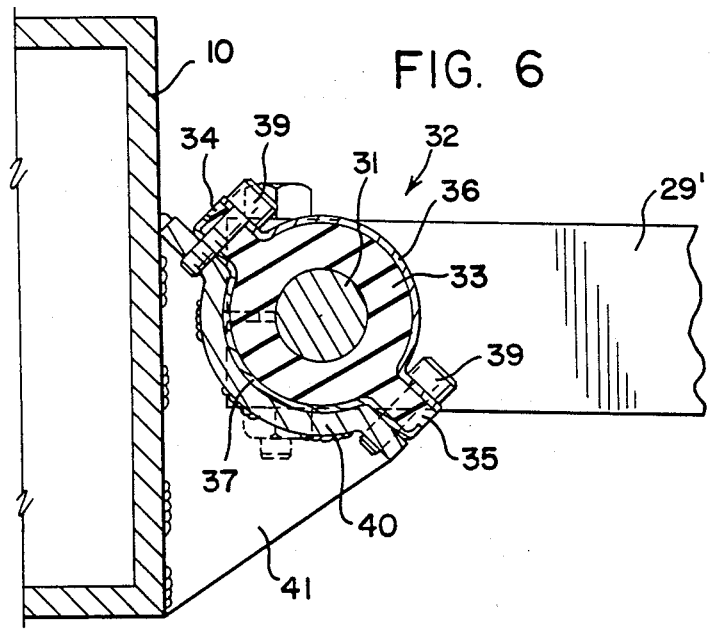
FIG. 6 is a cross-sectional view of the torsion spring taken on line 6—6 in FIG. 5.

Wheels 20 and 21 have a brake drum housing 23 (FIG. 2) which has an upper extension bracket 24 (FIGS. 2 and 5) and a lower extension bracket 25 (FIGS. 2 and 3). Upper bracket 24 (FIG. 5) has a pair of integral, laterally extending shaft extensions 26 and 27 for supporting the ends of assembly housings 28' and 28, respectively. Housings 28 and 28' are split to facilitate the assembling of the bearings within such housing on shafts 26 and 27. Each housing 28-28' has inwardly extending control arms 29-29' joined together at their intermediate portions by a bolt 30. The inner ends of each control arm 29-29' have a bore which receives a shaft 31 of a torsion spring device 32. Only one of such torsion spring devices 32 will be described, it being understood that they are alike and mutually interchangeable. As seen in FIG. 6, shaft 31 has its outer surface bonded to the inner surface of an annular sleeve 33 of elastomeric material. Annular sleeve 33 has a pair of diametrically disposed projections 34 and 35. The outer surface of elastomeric annular sleeve 33 is bonded to the inner surfaces of a pair of half shells 36 and 37. Each half shell 36 and 37 has a pair of outwardly extending projections with a plurality of apertures therethrough to receive bolts 39 which also pass through apertures in the projections 34 and 35 to provide a means for attaching the torsion springs 32 to the frame of the vehicle. To securely fasten the respective torsion springs 32 to the support members 10 or 11 of the frame, a semi-cylindrical boss 40 receives the lower half shell 37 and is bolted to the torsion spring by the bolts 39. Boss 40 has a plurality of triangular shaped webs 41 that are suitably welded to the box-type support members 10 and 11 of the chassis frame. Each shaft 31 has an angular groove 42 (FIG. 5) adjacent one end thereof that registers with a bore in control arms 29-29 whereby a bolt 43 (FIG. 5) received by such bore secures shaft 31 to their respective control arm 29-29'.

Figure 4:
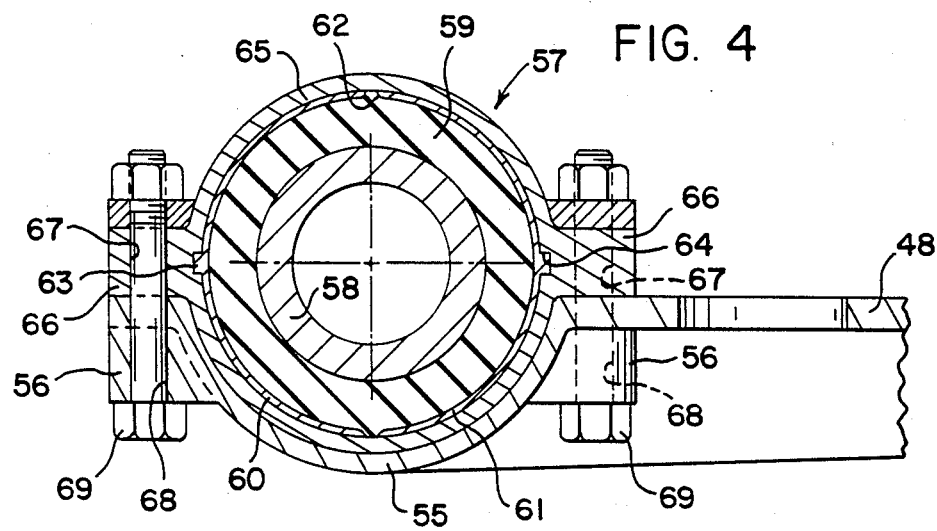
FIG. 4 is an enlarged cross-sectional view taken of the torsion spring construction taken on line 4—4 in FIG. 3.
Figure 7:
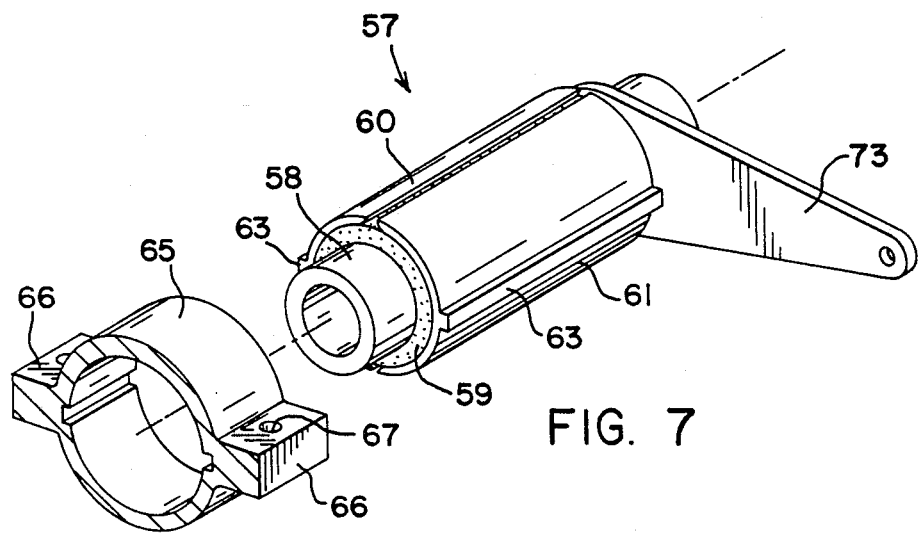
FIG. 7 is a perspective view partly exploded depicting the means for adjusting the torsion spring.

The lower extension bracket 25 (FIG. 3) has a pair of laterally extending shaft extensions 45 and 46 on which is mounted bearing assemblies. A pair of suspension arms 48 and 49 have bores 50 on one end thereof to slidingly receive the respective end portions of shafts 45 and 46. The respective ends of shafts 45 and 46 are threaded and receive nuts 52 to retain the suspension arms 48 and 49 into a unitary bracket means. Each suspension arm 48 and 49 has an upwardly extending web portion 53 with aligned bores to accommodate bolts 54 to firmly secure such suspension arms 48 and 49 together. The other end of each suspension arm 48 and 49 terminates into an arcuate segment 55 (FIG. 4) having a pair of bosses 56. A torsion spring 57 is mounted on arcuate segment 55 in a manner to be described. As seen in FIGS. 3 and 4, torsion spring 57 has an annular sleeve or shaft 58 with its outer surface bonded to the inner surface of an annular sleeve member 59 of elastomeric material. The outer surface of elastomeric sleeve member 59 is bonded to a pair of semi-cylindrical half shells 60 and 61. Such annular elastomeric sleeve member 59 which operates as the spring element is molded and vulcanized in the usual way in the space between the shell halves 60 and 61 and the annular sleeve 58, preferably with rubber-to-metal cement adhesives. The mold used for supporting the components of the torsion spring during the molding and vulcanization operation is shaped to permit the rubber or elastomeric material to fill the entire space between the longitudinal edges of the shell halves 60 and 61 and become bonded firmly to the rounded edges 62 clear out to the generally cylindrical external surface of the shell halves. A key 63 is formed on the external surface of each shell half 60 and 61 midway along its annular surface. The keys 63 are received by keyways 64 in cylindrical housing 65. Cylindrical housing 65 has a pair of outwardly extending flanges 66 with bores 67 therethrough which bores 67 are in alignment with bores 68 in bosses 56. Bolts 69 passing through bores 67 and 68 secure the torsion spring 57 to the suspension arms 48 and 49. The respective ends of sleeve 58 are journaled in bearing supports 70 which in turn are fastened to mounting brackets 71 which are connected via brackets 72 to either support members 10 or 11 as by welding as seen in FIG. 2. An elongated paddle 73 (FIGS. 3 and 7) has a bore in one end thereof receiving sleeve 58 and is suitably connected thereto as by welding. The other end of paddle 73 is connected to a swivel member 74 (FIGS. 2 and 3). Swivel member 74 has a bore 75 which receives an adjusting rod 76 threaded on one end and connected to support members 10 or 11 on the other end via a swivel block 77. Threaded rod 76 has a pair of nuts threaded thereon on either side of the swivel member 74 to effect adjustment of the torsion in torsion spring 57 which in turn can adjust the height of the suspension system discussed above. Suitable shock absorbers 80 are interconnected between the chassis frame and the suspension arms 48 and 49 and operate in the normal manner to perform its normal function.

Figure 8:
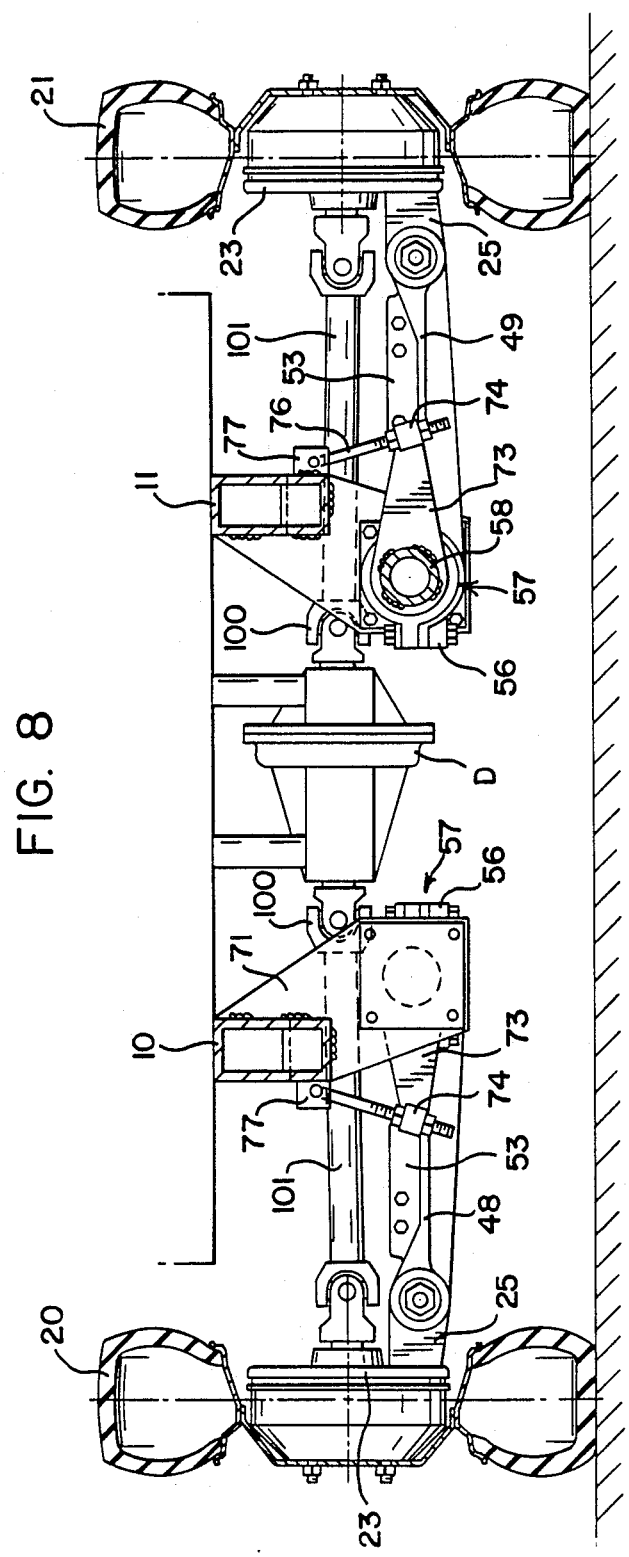
FIG. 8 is a front elevational view of a modified form of a suspension system similar to FIG. 2.

A modification of the above described suspension system is shown in FIG. 8 wherein like reference numerals designate like parts as in the first described embodiment such as the laterally spaced support members 10 and 11 (part of the main support frame), differential D, wheels 20 and 21, and brake drum housings 23. Each brake drum housing 23 has a lower extension bracket 25.

The lower bracket 25 is connected to a torsion spring device identical to that described in the first embodiment such as suspension arms 48 and 49 with web portions 53, bosses 56 and torsion spring 57. Also shown is shaft 58 of torsion spring 57 welded to one end of paddle 73 whose other end is connected to swivel member 74. Swivel member 74 has the adjusting rod 76 that is threaded on one end and connected to support member 10 or 11 on the other end via a swivel block 77. Threaded rod 76 has a pair of nuts threaded thereon on either side of the swivel member 74 to effect adjustment of the torsion in the torsion spring 57 which in turn can adjust the height of the suspension system. Thus the lower suspension means for the modified design shown in FIG. 8 is identical to lower suspension means described in the first embodiment. There is no upper suspension means for the modified design shown in FIG. 8. The output of differential D in the modified design is connected via universal joint 100 to a drive shaft 101 which in turn rotates wheels 20 and 21 in a manner old and well known in the art. The modified form of the design shown in FIG. 8 operates similar to the first embodiment wherein the lower torsion spring 57 can be adjusted for the desired tension via paddle 73 with the drive shaft 101, however, cooperating with the lower suspension means to maintain the stability of the drive for wheels 20 and 21 and the suspension of the vehicle. Such cooperative action allows for the need of a lower clearance space than heretofore designs. The novel action of the suspension means is enhanced by the parallel relationship of the driven shaft 101 to the interconnecting bracket means between the torsion spring 57 and the brake drum housing 23.

Various modifications are contemplated and may obviously be resorted to by those skilled in the art without departing from the described invention, as hereinafter defined by the appended claims, as only a preferred embodiment thereof has been disclosed.

We claim:

1. A vehicle suspension system having the weight of the vehicle supported by torsion springs comprising a vehicle chassis, said vehicle having a wheel with a driven shaft connected thereto, said wheel supported by a wheel drum bracket means, a first pair of torsion springs non-rotatably mounted in longitudinally spaced alignment with each spring having an annulus of elastomeric material as the yieldable element, each of said torsion springs having an inner shaft securely fastened to the inner periphery of said elastomeric annulus, said inner shafts firmly secured to said chassis, each of said torsion springs having an outer shell securely fastened to the outer periphery of said annulus of said elastomeric yieldable element, said outer shells connected to the lower portion of said wheel drum bracket means, a second pair of torsion means non-rotatably mounted in longitudinally spaced alignment with each of said second pair of torsion springs having an annulus of elastomeric material as the yieldable element, each of said second pair of torsion springs having an outer sleeve securely fastened to the outer periphery of said elastomeric annulus of said second pair of torsion springs, said outer sleeves firmly secured to said chassis, each of said second pair of torsion springs having an inner rod securely fastened to the inner periphery of said elastomeric annulus of said second pair of torsion springs, said rods connected to the upper portion of said wheel drum bracket means to provide a balanced suspension system for said rotatable wheel.

2. A vehicle suspension system as set forth in claim 1 wherein each of said connections of said outer shells and said rods to said wheel drum bracket means are pivotal connections adjacent said wheel.

3. A vehicle suspension system as set forth in claim 2 wherein said driven shaft for said wheel is located between first pair and second pair of torsion springs.

4. A vehicle suspension as set forth in claim 3 wherein said driven shaft connected to said wheel to rotate said wheel has a splined portion to facilitate axial extension and retraction of said shaft as said wheel moves in a vertical plane.

5. A vehicle suspension system as set forth in claim 4 wherein each of said inner shafts are journaled in bracket means secured to said chassis, and each of said shafts have one end of an elongated padlle secured thereto, the other ends of said elongated paddles have an adjusting rod secured thereto and to said chassis to provide means for preloading said elastomeric annulus of said first pair of torsion springs.

6. A vehicle suspension system having the weight of the vehicle supported by torsion springs comprising a vehicle chassis, said vehicle having a differential mounted on said chassis with a pair of drive shafts extending outwardly from said differential, said vehicle having a pair of spaced wheels connected to said drive shaft for rotating said wheels, each of said drive shafts having splined portions to allow independent axial telescopic movement of the drive shaft and correspondingly of said wheel on said drive shaft relative to said differential, each of said wheels having a stationary wheel drum bracket means to support said wheels for rotation, torsion spring means interconnecting each of said bracket means to said chassis, each torsion spring means having an outer shell member and an inner shaft member bonded to an elastomeric annulus, said elastomeric annulus is the yieldable element of said torsion spring means, one of said members is connected to said wheel drum bracket means, and the other one of said members is secured to said chassis to provide a suspension sytem that eliminates stresses on said drive shafts.

7. A vehicle suspension system as set forth in claim 6 wherein said torsion spring means has said members connected to wheel drum bracket means as a pivotal connection adjacent said wheels.

8. A vehicle suspension means as set forth in claim 7 wherein said torsion spring means has adjusting means connected thereto for preloading a torsion force to said elastomeric annulus.

9. A vehicle suspension system as set forth in claim 8 wherein the outer shell member of each torsion spring is pivotally connected to an adjacent one of said drum bracket means, and said inner shaft member is adjustably secured to said chassis.

10. A vehicle suspension system as set forth in claim 6 wherein said torsion spring means interconnecting each of said wheels to said chassis includes an upper pair of torsion springs and a lower pair of torsion springs, said outer shell members of said lower pair of torsion springs are pivotally connected to said wheel drum bracket means, said inner shaft members of said lower pair of torsion springs are connected to said chassis, said outer shell members of said upper pair of torsion springs are secured to said chassis, and said inner shaft members of said upper pair of torsion springs are pivotally connected to said wheel drum bracket means.

11. A vehicle suspension system as set forth in claim 10 wherein said wheel drum bracket means has an upper section and a lower section, said drive shafts connected to each of said wheels being located between said upper section and said lower section, said upper pair of torsion springs are connected to said upper section of said wheel drum bracket means, and said lower pair of torsion springs are connected to said lower section of said wheel drum bracket means.

12. A vehicle suspension system having the weight of the vehicle supported by torsion springs comprising a vehicle chassis, said vehicle having a wheel with a drum shaft connected thereto, said wheel supported by a wheel drum bracket means, a first pair of torsion springs non-rotatably mounted in longitudinally spaced alignment, each of said springs having an annulus of elastomeric material as the yieldable element, each of said springs having an inner shaft securely fastened to the inner periphery of said elastomeric annulus, said inner shaft firmly secured to said chassis, each of said springs having an outer shell securely fastened to the outer periphery of said annulus of said elastomeric yieldable element, said outer shells pivotally connected to said wheel drum bracket means, and said torsion spring means having support means interconnecting said annulus of elastomeric material and said pivotal connection to said wheel drum that is substantially parallel to said driven shaft.

13. A vehicle suspension system as set forth in claim 12 wherein said driven shaft has a universal joint connection to said wheel and a universal joint connection to a differential output means.

* * * * *